United States Patent [19] [11] 3,903,376
Nishikiori [45] Sept. 2, 1975

[54] OPERATING DEVICE FOR PUSH BUTTON-DIALLED TELEPHONE

[75] Inventor: Akira Nishikiori, Hirakata, Japan

[73] Assignee: Matsushita Electric Industrial Co., Ltd., Osaka, Japan

[22] Filed: Oct. 2, 1973

[21] Appl. No.: 402,746

Related U.S. Application Data

[63] Continuation of Ser. No. 122,102, March 8, 1971, abandoned.

[30] Foreign Application Priority Data

| | | |
|---|---|---|
| Apr. 4, 1970 | Japan | 45-28897 |
| Apr. 20, 1970 | Japan | 45-34427 |
| Mar. 11, 1970 | Japan | 45-23875 |

[52] U.S. Cl. .......... 179/90 BB; 179/90 B; 179/2 DP; 179/90 AD

[51] Int. Cl. .......... H04m 1/46

[58] Field of Search .......... 179/90 BB, 90 BD, 90 B, 179/90 K, 90 AD, 2 DP

[56] References Cited

UNITED STATES PATENTS

| | | | |
|---|---|---|---|
| 3,387,099 | 6/1968 | Fischer | 179/90 BB |
| 3,456,085 | 7/1969 | Huizinga | 179/90 BB |
| 3,712,960 | 1/1973 | Baron | 179/90 BB |
| 3,735,050 | 5/1973 | Mardas | 179/90 B |

*Primary Examiner*—Kathleen H. Claffy
*Assistant Examiner*—Thomas D'Amico
*Attorney, Agent, or Firm*—Stevens, Davis, Miller & Mosher

[57] ABSTRACT

An operating device for a push button dialled telephone in which pressers driven by electromagnetic solenoids are provided opposite to push buttons of the push button dialled telephone and the push buttons are depressed as desired with a power supply appropriately controlled by said electromagnetic solenoids. Dialling operation can be performed, without touching a finger directly on the push buttons, by means of an additional device for generating automatically a variety of controlled electrical signals.

2 Claims, 53 Drawing Figures

INVENTOR

BY

ATTORNEY

INVENTOR

BY

ATTORNEY

INVENTOR

BY

ATTORNEY

INVENTOR

BY

ATTORNEY

FIG. 13
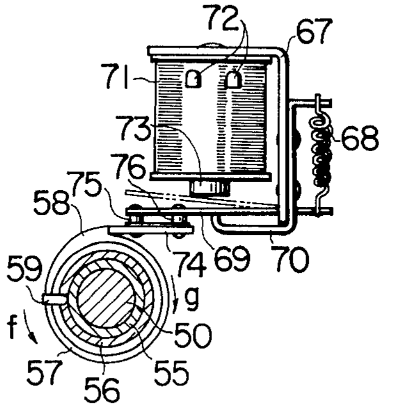
FIG. 14
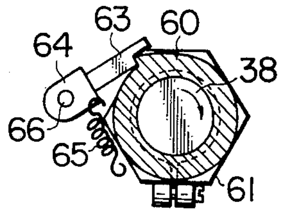
FIG. 15
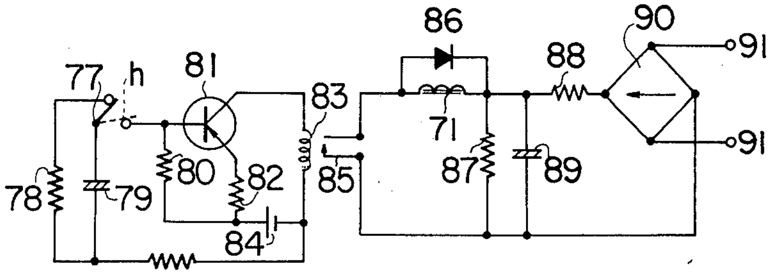
FIG. 18
| | | | | | | | | | | | | | | | |
|---|---|---|---|---|---|---|---|---|---|---|---|---|---|---|---|
| 4 | X | 7 | X | ( | 3 | + | 5 | ) | − | 8 | . | 6 | ÷ | 2 | = |
| 4 | 6· | 7 | 6· | 1· | 3 | 2· | 5 | 4· | 3· | 8 | 8· | 6 | 9· | 2 | ·· ⊙ |
INVENTOR
BY
ATTORNEY

INVENTOR

BY

ATTORNEY

INVENTOR

BY

ATTORNEY

INVENTOR

BY

ATTORNEY

INVENTOR

BY

ATTORNEY

INVENTOR

BY

ATTORNEY

INVENTOR

BY

ATTORNEY

INVENTOR

BY

ATTORNEY

INVENTOR

BY

ATTORNEY

INVENTOR

BY

ATTORNEY

INVENTOR

BY

ATTORNEY

INVENTOR

BY

ATTORNEY

INVENTOR

BY

ATTORNEY

INVENTOR

BY

ATTORNEY

INVENTOR

BY

ATTORNEY

INVENTOR

BY

ATTORNEY

INVENTOR

BY

ATTORNEY

INVENTOR

BY

ATTORNEY

INVENTOR

BY

ATTORNEY

INVENTOR

BY

ATTORNEY

INVENTOR

BY

ATTORNEY

OPERATING DEVICE FOR PUSH BUTTON-DIALLED TELEPHONE

This is a continuation of application Ser. No. 122,102, filed Mar. 8, 1971, now abandoned.

The present invention relates to an operating device for a push button dialled telephone.

The extension of use of push button dialled telephones in recent years has made possible transmission of numerals, symbols and characters, broadening the variety of telephone services offered. For example, in a computation service, symbols in mathematical formulae and instructions on computation other than numerals are expressed by depressing two or more buttons on a push button dialled telephone representing numerals 0, 1, 2, . . . ., 9 and symbols " · " "⊙" (which may be replaced by "*" and " # "). It is, however, troublesome for an operator to express a multiplicity of characters and symbols by various combinations of the 12 buttons representing the 10 numerals and two symbols. In addition, this is a great roadblock to improved operating efficiency.

In order to obviate these disadvantages, one method consists in coupling to a telephone line a device with means for frequency oscillation, in which frequency signals corresponding to two or more numerals or symbols "·" and "⊙" are oscillated at regular intervals at the press of a single button. In such a device, a signal transmitted later of the above-mentioned two kinds of signals is passed through a delay circuit to obtain a pause between numerals. However, such a device requires high accuracy of signals transmitted to the telephone line, offering problems of manufacturing technique and cost. Further, since the device has to be connected directly with the telephone line and telephone, it is necessary to turn to construction specialists skilled in the construction work.

There is an automatic dialling device for a push button dialled telephone which contains within it a frequency transducing means similar to the one housed in the telephone itself and this frequency transducing means is connected with the telephone line for dialling operation. However, such an automatic dialling device requires a high precision of the frequency transducer housed therein, also offering many problems of manufacturing technique and cost. In addition, the need for direct connection with the telephone line makes it inconvenient for general users to handle the device.

It is accordingly an object of the present invention to provide means for sending dial signals to a telephone line without direct manual operation of a push button dialled telephone.

Another object of the present invention is to make it easy for persons other than specialists to mount the above-mentioned means.

Still another object of the present invention is to drive by electromagnetic force pressers for depressing push buttons of a telephone, thereby performing remote control.

Still another object of the present invention is to make it possible to operate the pressers directly by hand in order that the same operation as the depression of buttons may be performed without taking off a push button device from the telephone.

Still another object of the present invention is to provide a plurality of examples of the construction of the pressers which are driven electromagnetically.

Still another object is to provide a control device with manually-operated buttons, each of which, by a single depression, produces signals for driving and depressing a plurality of pressers at certain time intervals.

Still another object of the present invention is to provide an automatic dialling device in which regenerated outputs corresponding to a magnetically recorded telephone number are applied to electromagnetic solenoid of the pressers.

Still another object is to convert signals representing the digits of a telephone number into parallel signals and apply these parallel signals to a magnetic head movable on a plurality of tracks for magnetic recording thereby to increase the operating speed of the automatic dialling device.

Still another object of the present invention is to convert the digits of a telephone number into series signals and apply these series signals to a magnetic head for magnetic recording thereby to reduce the number of tracks.

Still another object of the present invention is to control the amount of feed of magnetic tape per digit of a telephone number by means of a timing circuit and to control periods of generation of recorded signals by another timing circuit, thereby providing a proper pause and reducing the tape length.

The above and other objects, features and advantages will be made apparent by the detailed description taken in conjunction with the accompanying drawings, in which.

Figures 1, 2, 3:
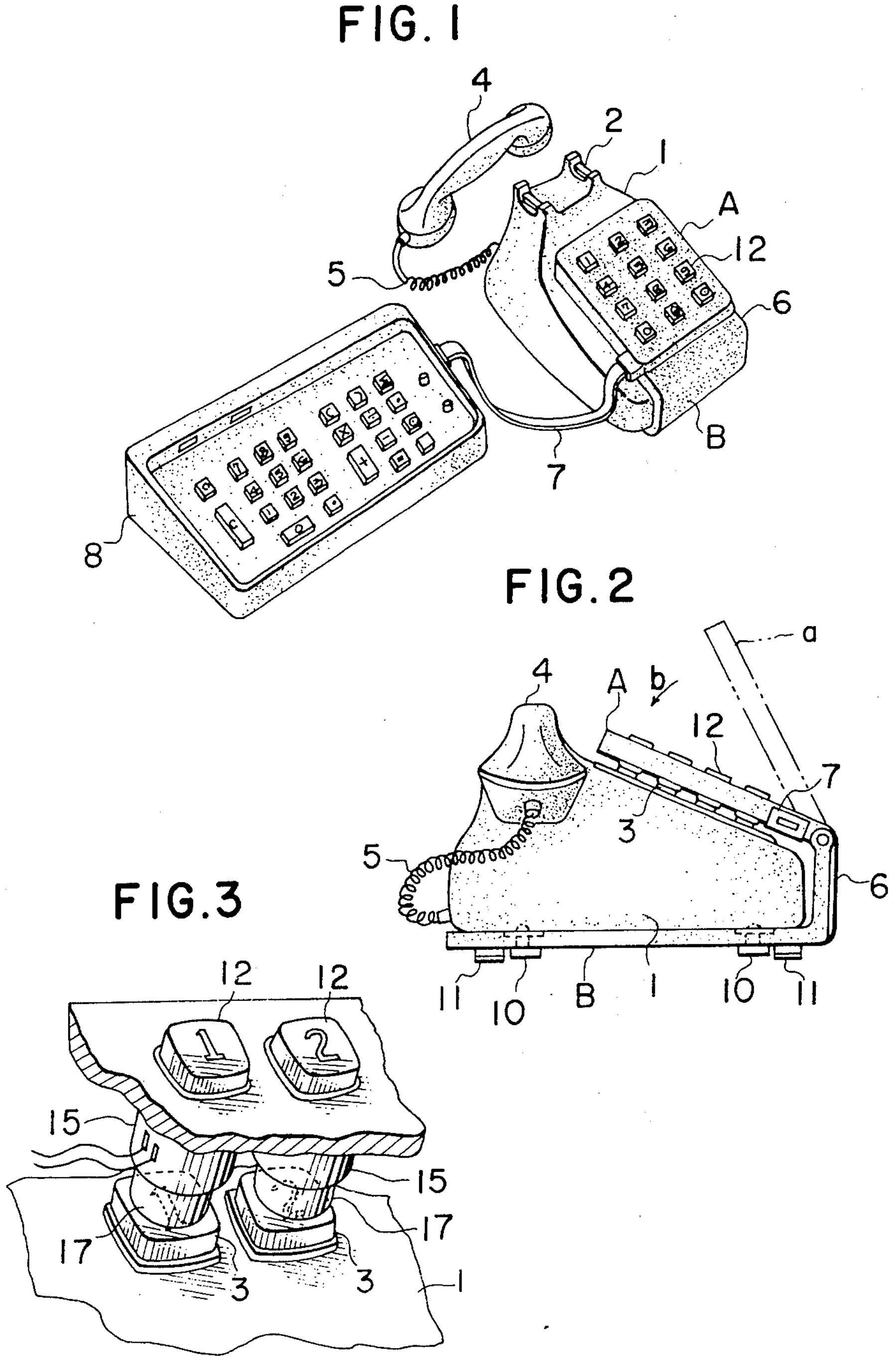
FIG. 1 shows a perspective view of an operating device according to an embodiment of the present invention as it is mounted on a telephone.
FIG. 2 is a diagram showing a side view of the operating device of FIG. 1.
Figure 4:
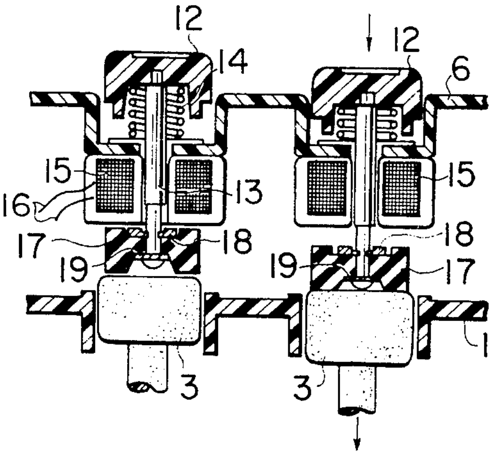

FIGS. 3 and 4 respectively show a perspective view and a cross-sectional view of the essential parts of the operating device.

Figure 5:
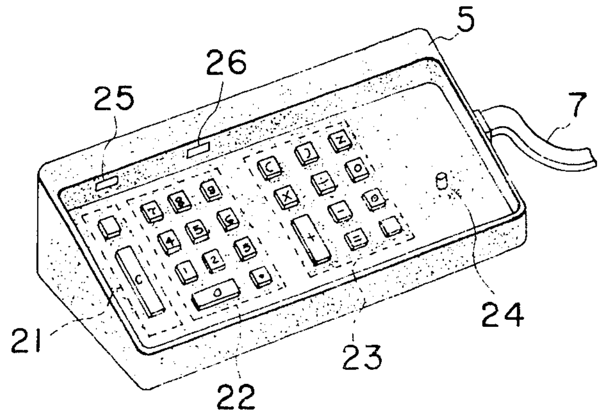
Figures 11, 12, 16:
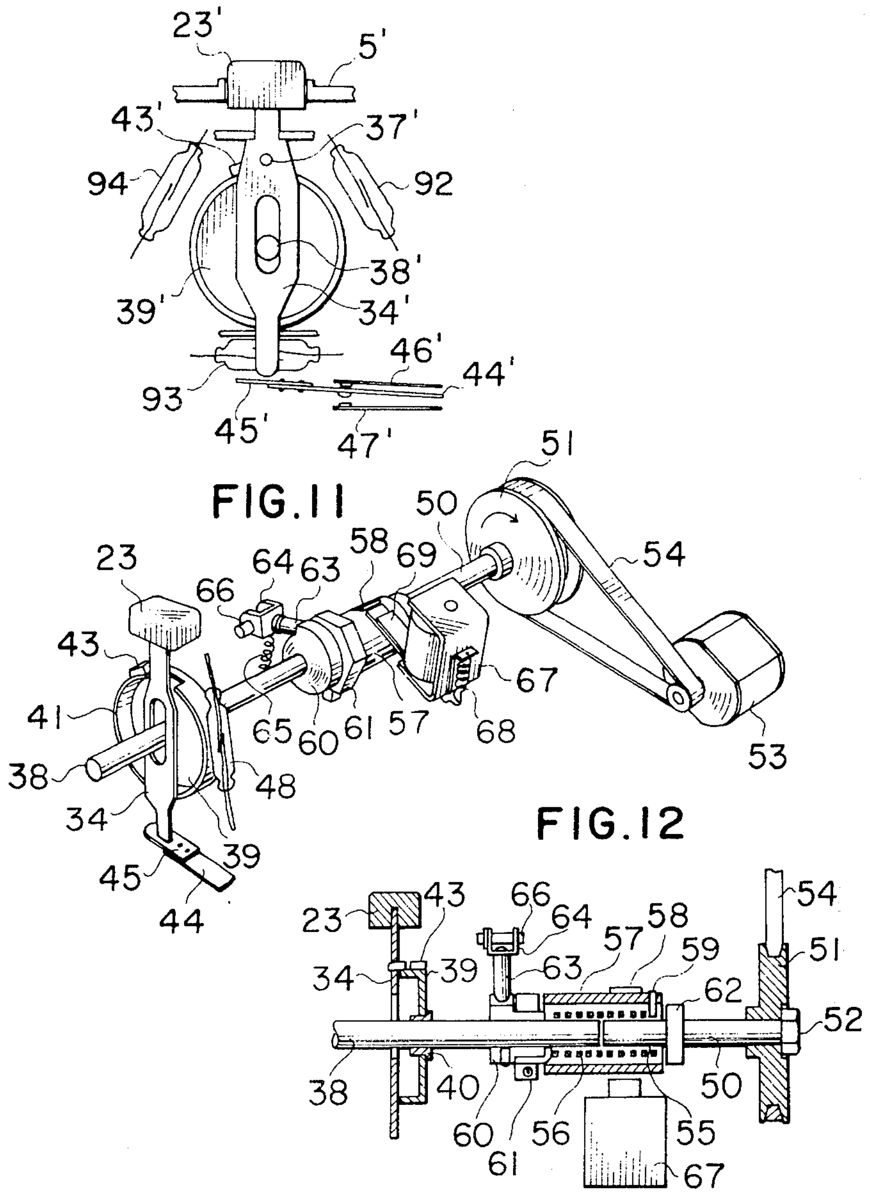
Figure 17:
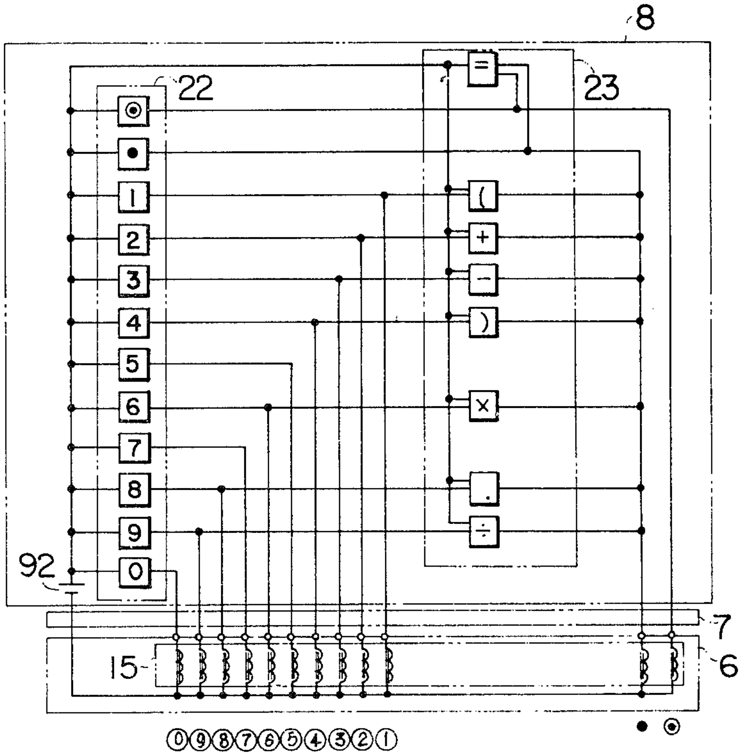
Figures 20, 21:
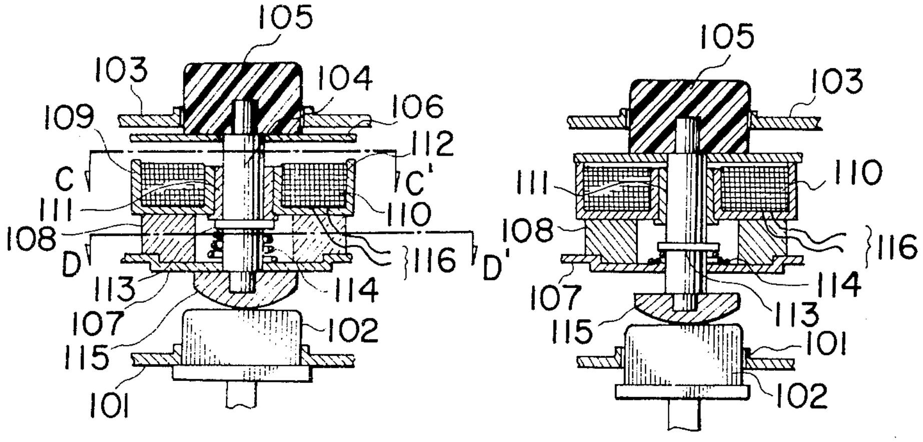
Figure 22:
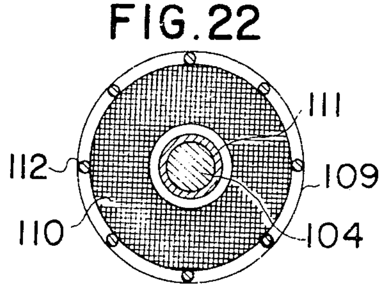
Figure 23:
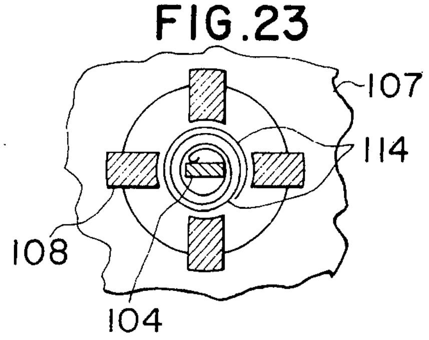
Figure 19:
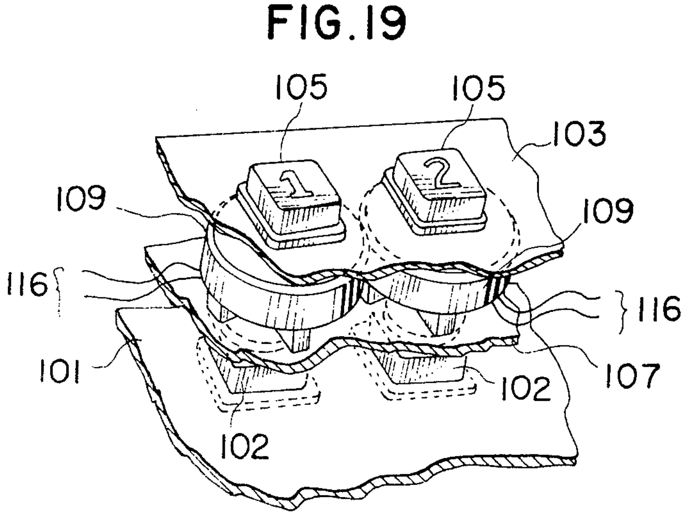
Figure 24:
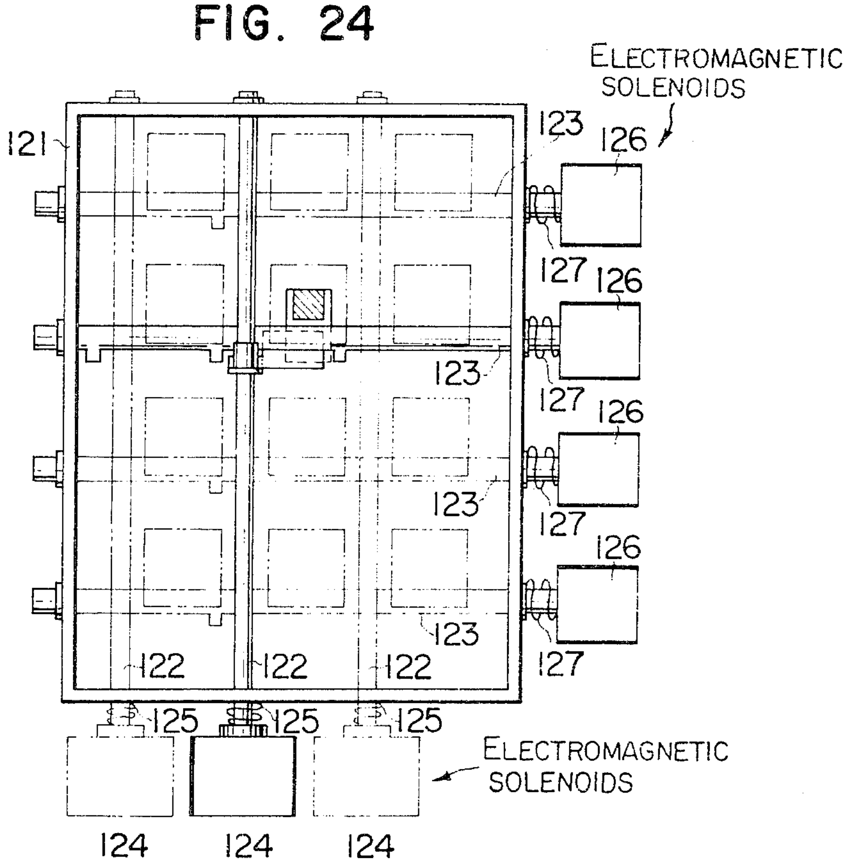
Figure 25:
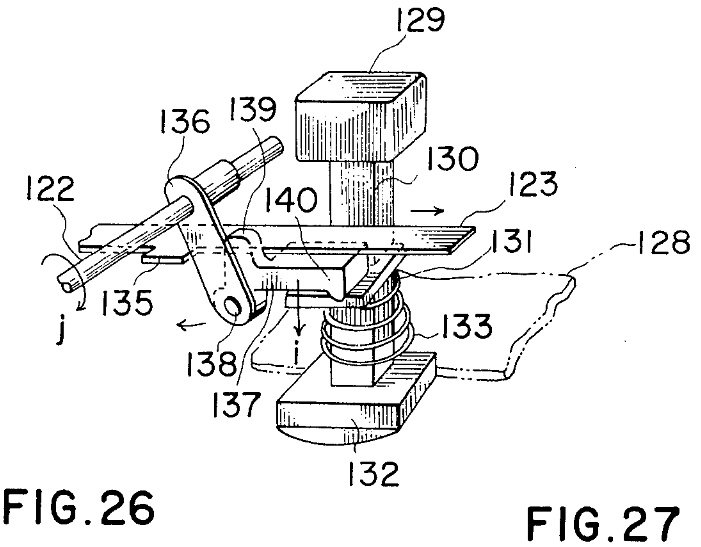
Figure 26:
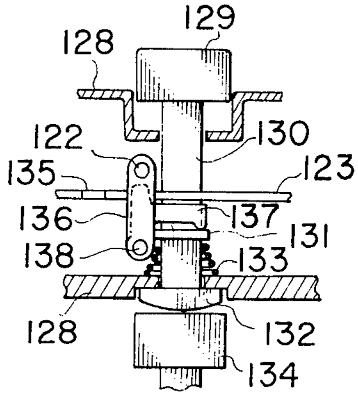
Figure 27:
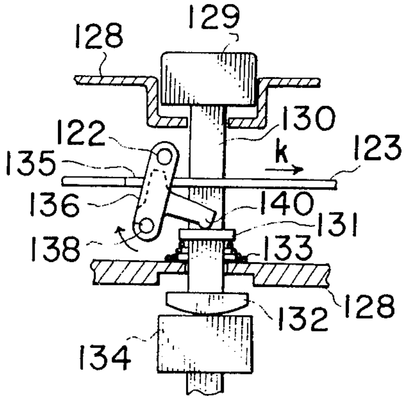
Figure 28:
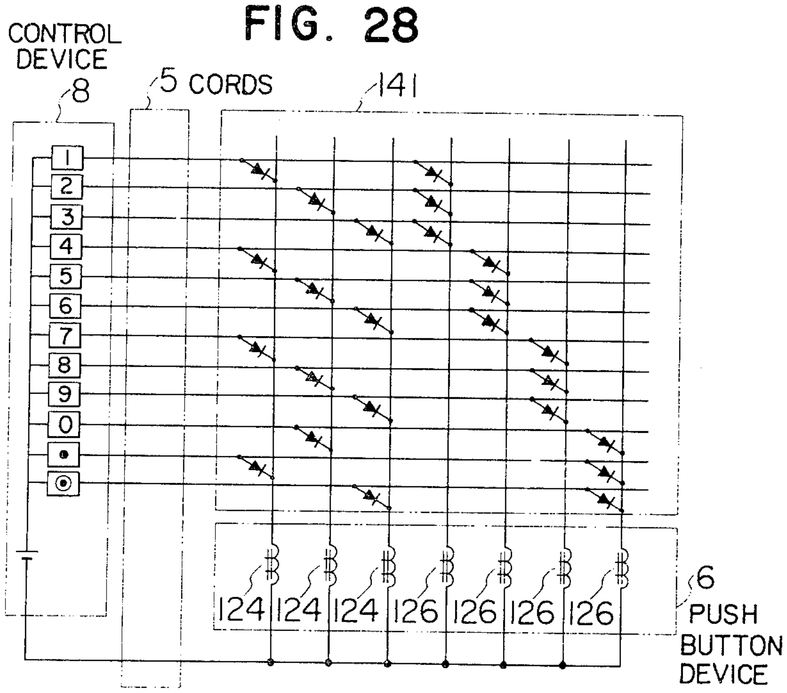
Figure 29:
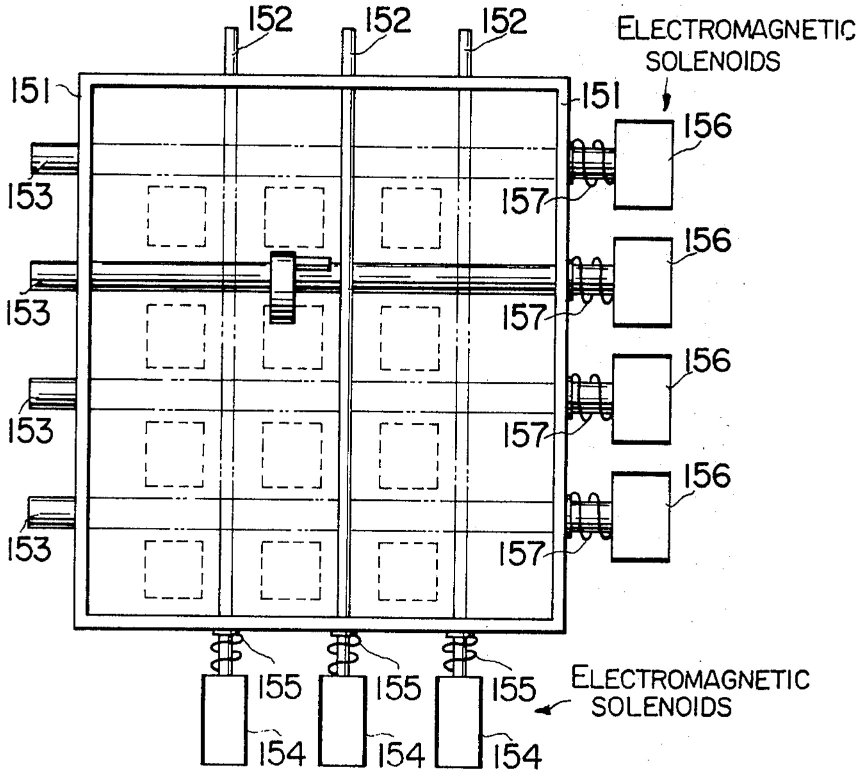
Figure 30:
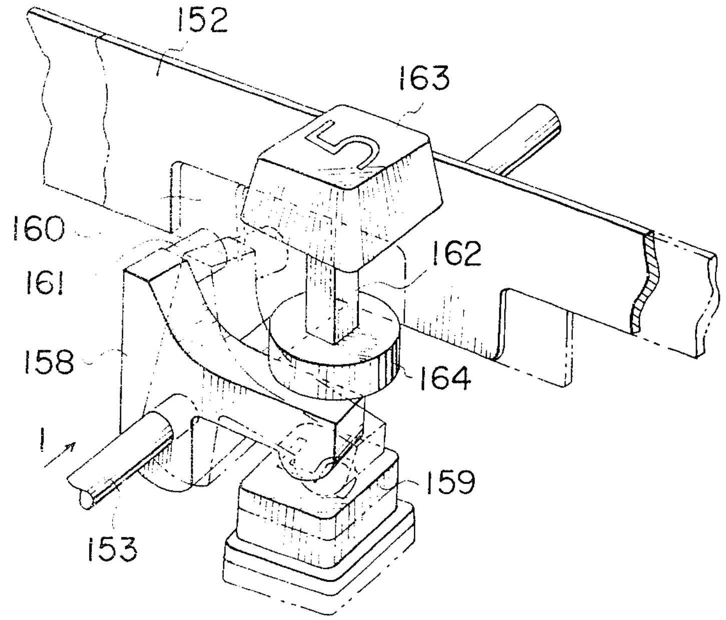
Figure 31:
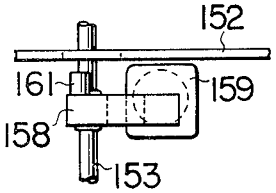
Figure 33:
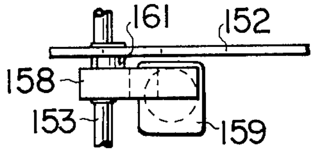
Figure 32:
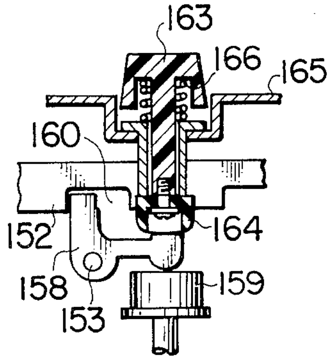
Figure 34:
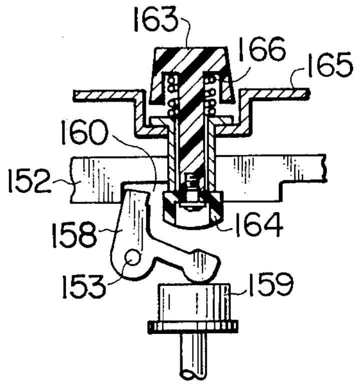
Figure 35:
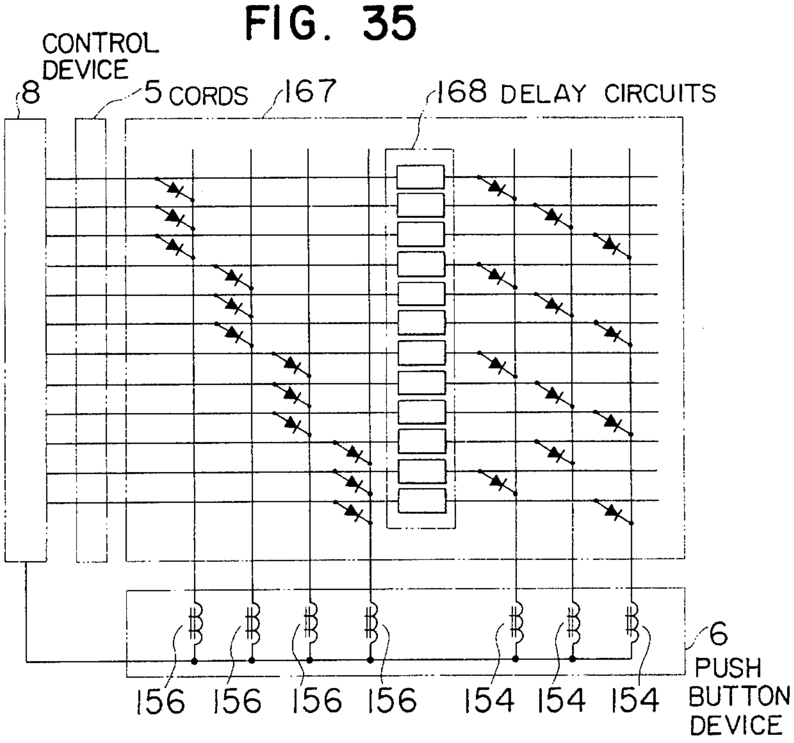
Figure 36:
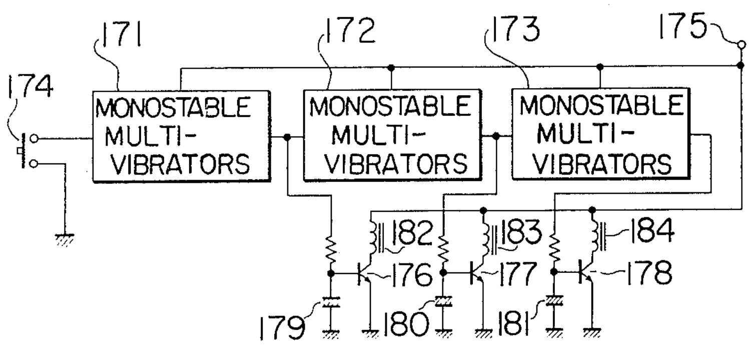
Figure 37:
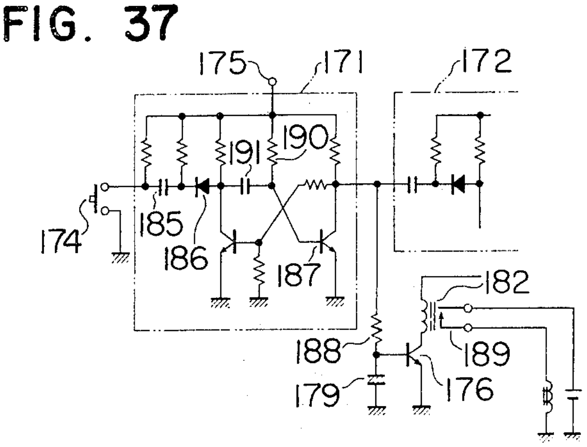
Figure 38:
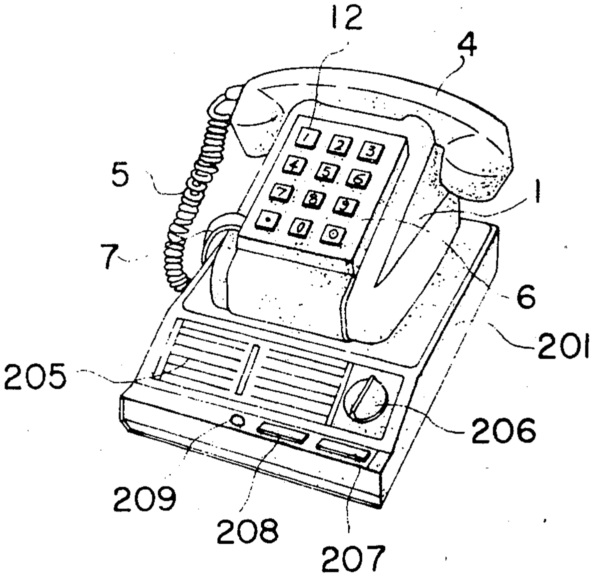
Figure 39:
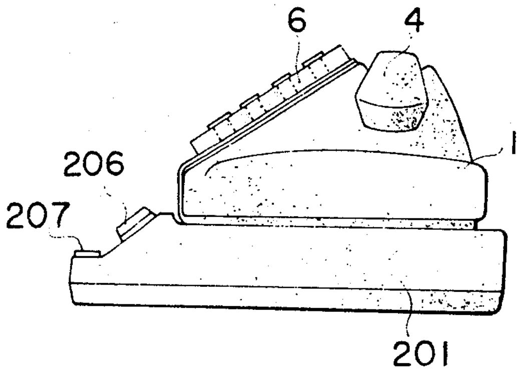
Figure 40:
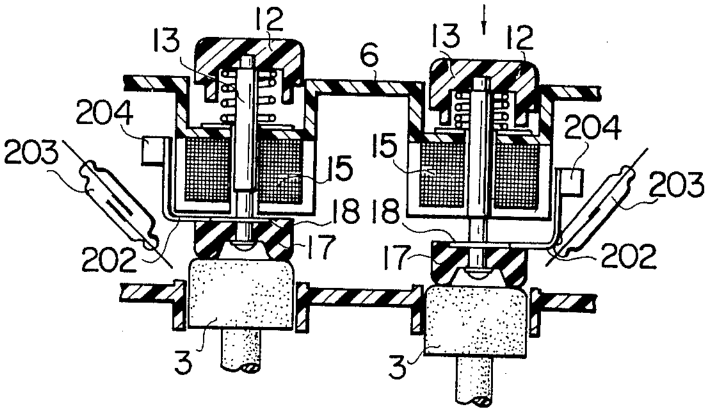
Figure 41:
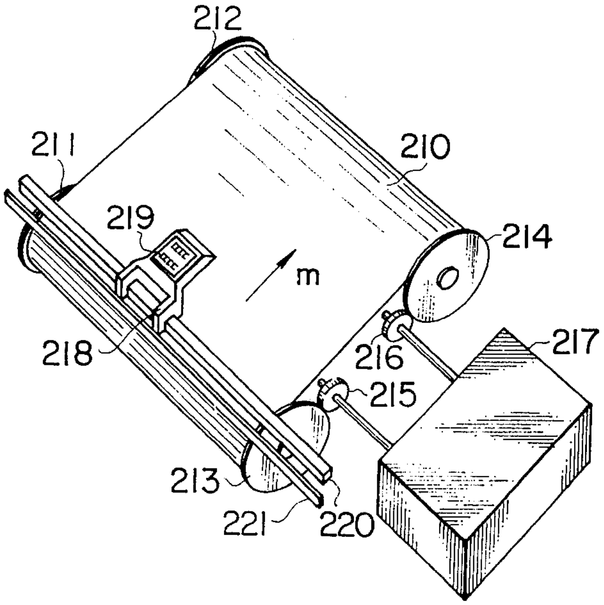
Figure 42:
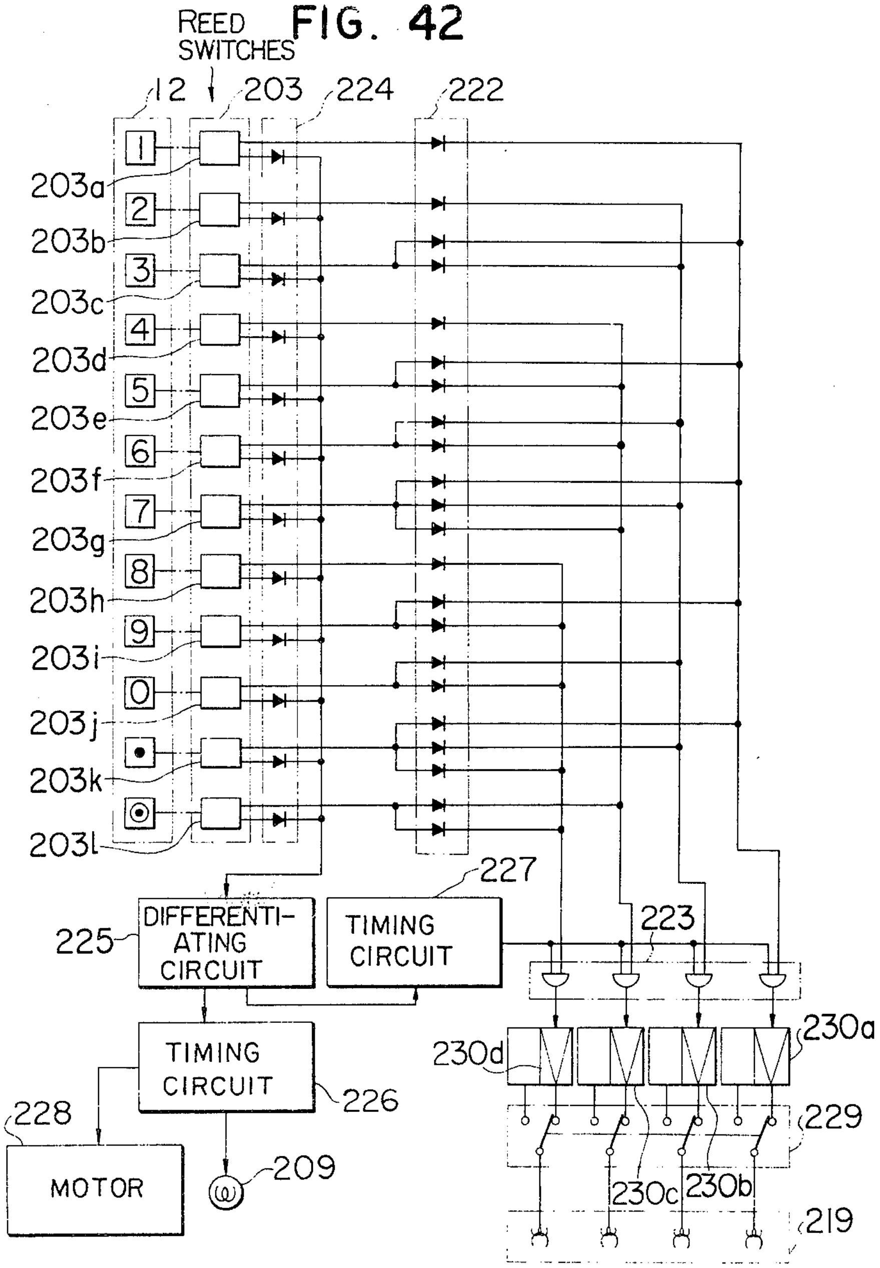
Figure 47:
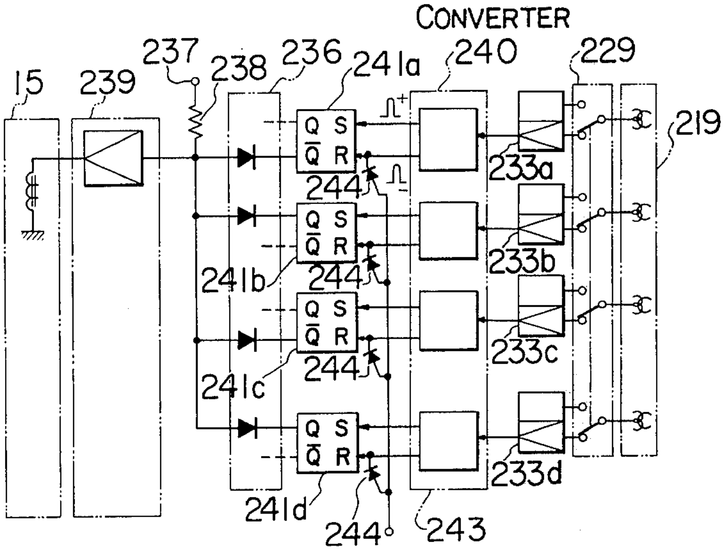
Figure 43:
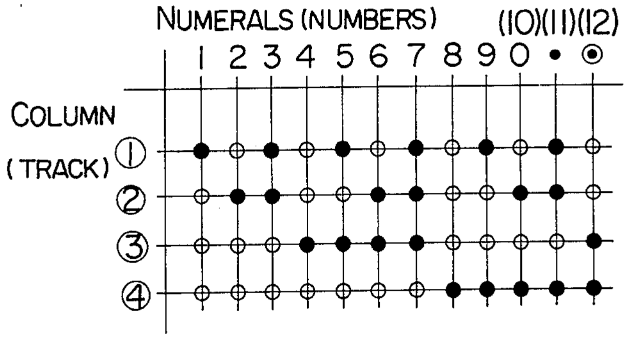
Figures 46A, 46B, 46C, 46D, 46E, 46F:
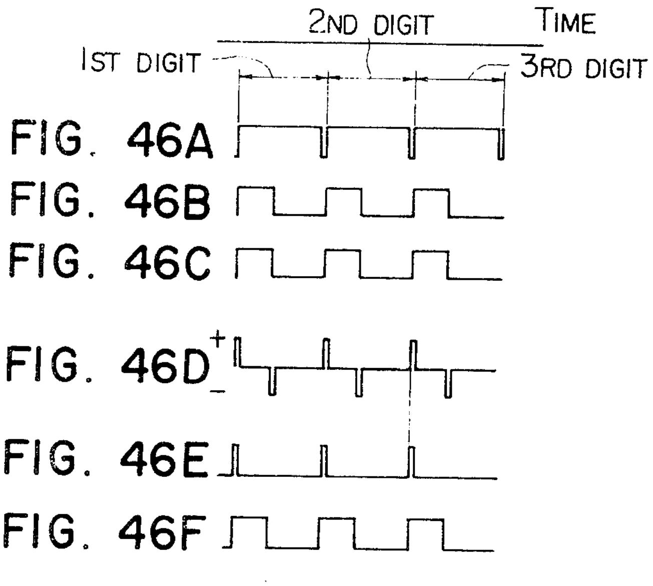
Figure 44:
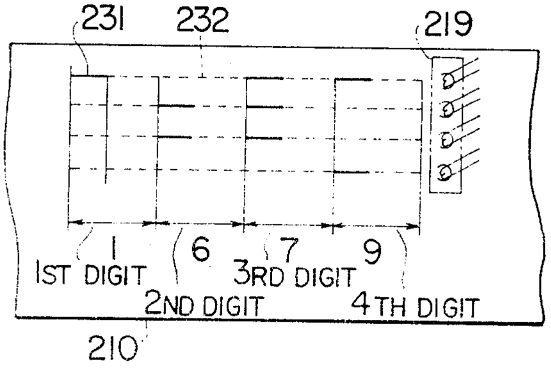
Figure 45:
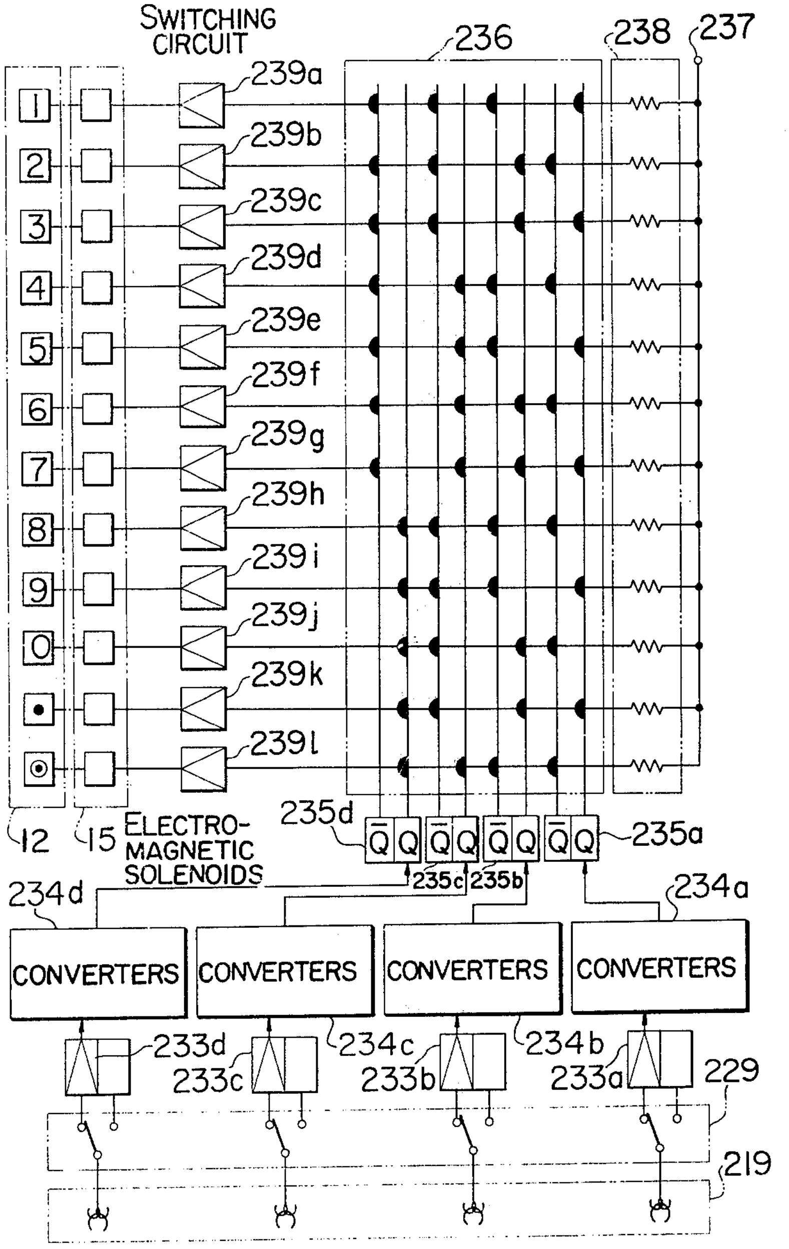
Figure 48:
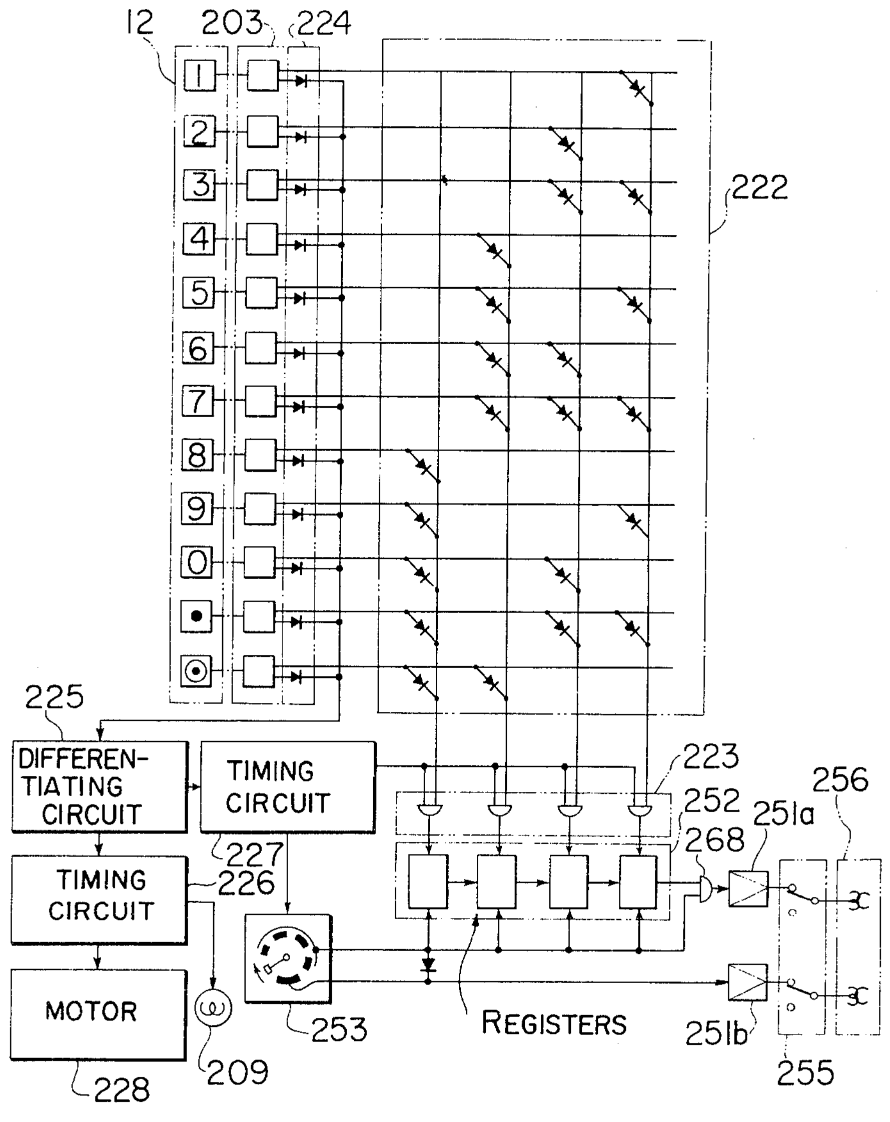
Figure 49:
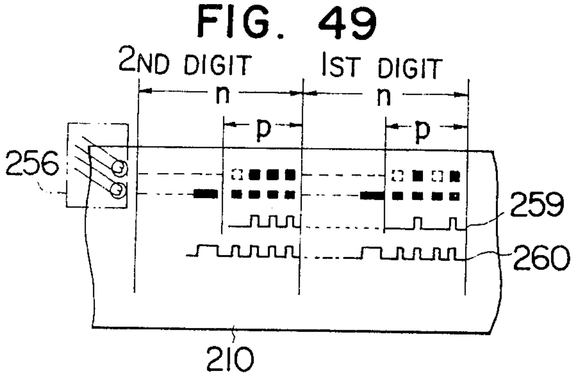
Figure 53:
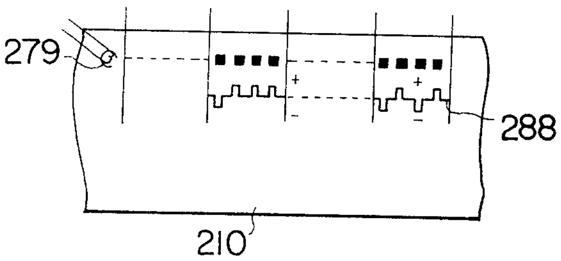
Figure 50:
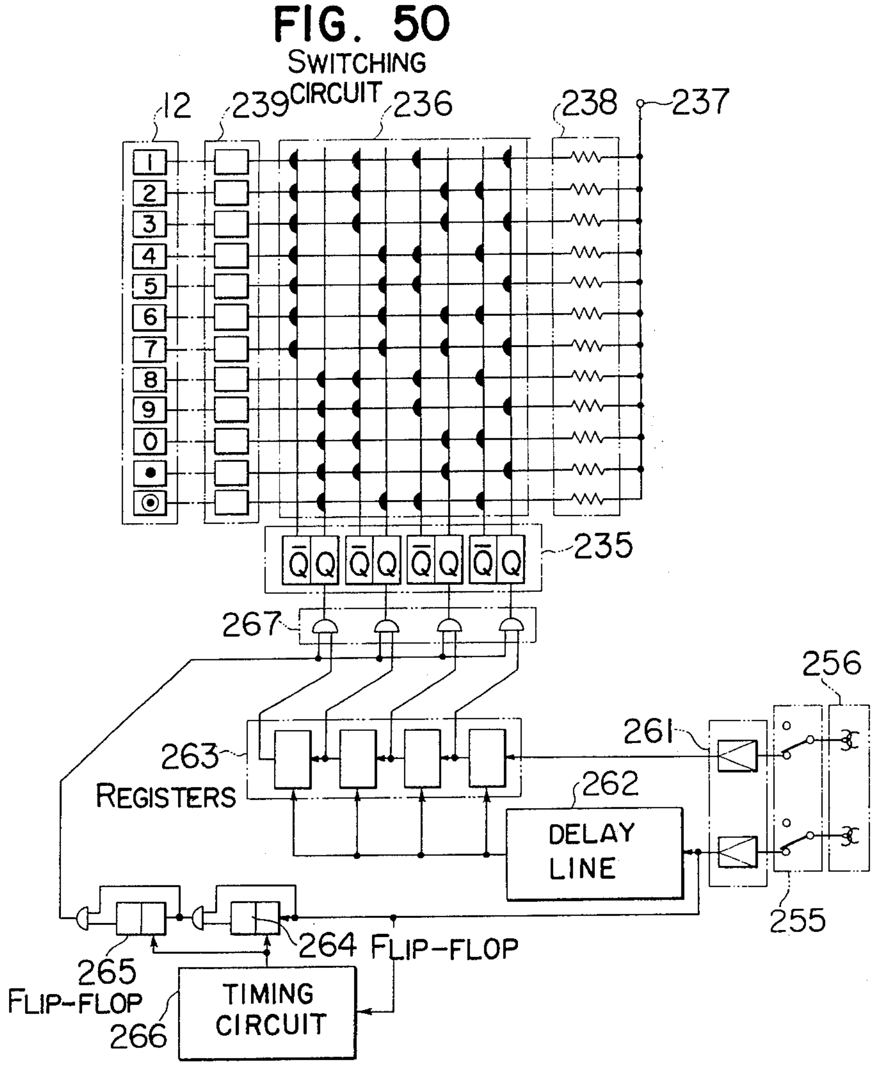
Figure 51:
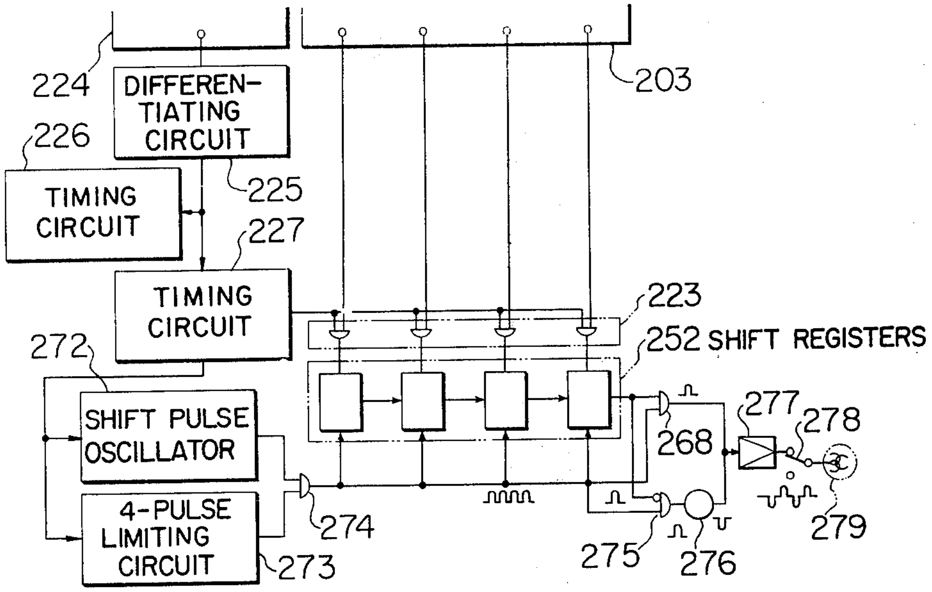
Figure 52:
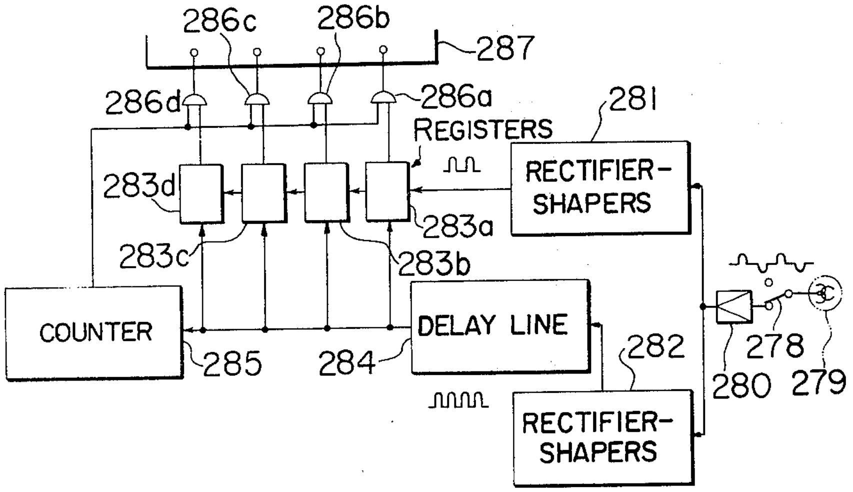

FIGS. 5 shows a perspective view of a control device for controlling a push button device;

FIGS. 6 to 14 are diagrams showing the inner construction of the control device;

FIG. 15 is a diagram showing an electrical circuit for energizing electromagnetic solenoids included in the control device;

FIG. 16 is a diagram showing the inner construction of the control device;

FIG. 17 is a block diagram showing electrical connections between the push button device and control device;

FIG. 18 is a diagram showing the relation between an example of calculation and dial numbers;

FIG. 19 is a perspective view of the essential parts of another embodiment of the push button device;

FIGS. 20 and 21 show cross-sectional views of the embodiment of FIG. 19;

FIGS. 22 and 23 show sections taken in the lines C – C' and D – D' respectively of FIG. 20;

FIG. 24 is a schematic diagram showing the construction of the push button device according to another embodiment of the present invention;

FIG. 25 shows a perspective view of the essential parts of the embodiment of FIG. 24;

FIGS. 26 and 27 show cross-sectional views of the same essential parts;

FIG. 28 is a block diagram showing the relation between the push button device and control device according to the embodiment of FIG. 25;

FIG. 29 is a schematic diagram showing the construction of the control device according to still another embodiment;

FIG. 30 shows a perspective view of the essential parts of the embodiment of FIG. 29;

FIGS. 31 and 33 show plans of the essential parts of FIG. 30 in different conditions;

FIGS. 32 and 34 show side views of the essential parts of FIGS. 31 and 33 respectively;

FIG. 35 is a block diagram showing the relation between the control device and push button device of the embodiment of FIG. 29;

FIGS. 36 and 37 are circuit digrams showing the essential parts of still another embodiment of the control device;

FIG. 38 is a perspective view showing the push button device according to the present invention as it is used as aa component of an automatic dialling device;

FIG. 39 shows a side view of the push botton device of FIG. 38;

FIG. 40 shows a cross-sectional view of the essential parts of the push button device;

FIG. 41 shows a perspective view of a magnetic recording-reproducing section of the automatic dialling device proper;

FIG. 42 shows a recording circuit of the automatic dialling device of FIG. 41;

FIG. 43 is a table showing a method of encoding a dial number;

FIG. 44 is a diagram showing recording traces on the magnetic tape;

FIG. 45 is a diagram showing a reproducing circuit of the automatic dialling device of FIG. 41;

FIG. 46 is a diagram showing waveforms of operations of the magnetic recording-reproducing section;

FIG. 47 is a block diagram showing another embodiment of the reproducing circuit;

FIGS. 48 and 50 are block diagrams respectively showing recording and reproducing circuits of another embodiment of the magnetic recording-reproducing section;

FIG. 49 is a diagram showing recording traces on the magnetic tape;

FIGS. 51 and 52 are block diagrams respectively showing recording and reproducing circuits of still another embodiment of the magnetic recording-reproducing section; and FIG. 53 is a diagram showing recording traces on the magnetic tape.

Referring to FIGS. 1 and 2, numeral 1 shows a push button dialled telephone proper, numeral 2 a hook swiitch, numeral 3 a plurality of push buttons provided on the push button dialled telephone proper 1, numeral 4 a handset connected to the telephone proper 1 through a cord 5, and numeral 6 a push button device for depressing the push buttons 3 on the telephone proper 1 either manually as usual or by electrical signals applied from an external control device 8 through the cord 7 and comprises a support B and an operating section rotatably supported on the shaft 9. Numeral 10 shows a screw for fixing the telephone proper 1 on the support B, and numeral 11 rubber pedestals provided on the support B. Numeral 12 shows a plurality of operating buttons provided on the push button device 6 in such a manner that they are placed opposite to the push buttons 3 when the telephone proper 1 is fixed on the push button device 6.

The detailed construction of the operating section A will be described below with reference to FIGS. 3 and 4. Numeral 13 shows a plunger with its top fixed on an operating button 12, numeral 14 a return spring for driving the plunger 13 upward, and numeral 15 an electromagnetic solenoid fixed on a housing of the push button device for moving the plunger 13 downward. Numeral 16 shows lead terminals for the electromagnetic solenoid, and numeral 17 a buffer fixed on the bottom of the plunger 13 by means of a fastening ring 18 and fastening rivet 19 to improve the contact with the push buttons 3.

When mounting the telephone proper on the push button device 6, the operating section A is rotated to the position indicated by a chain *a* in FIG. 2. Then, after disposing the telephone proper on the support B, the operating section A is rotated in the direction shown by arrow *b* and fixed as shown in FIGS. 1 and 2. At this time, the buffers 17 on the operating buttons 12 are brought into contact with the push buttons 3. This mounting process is very easy to follow since there is no need of direct connection with a telephone line.

When manually dialling, appropriate operating buttons 12 are depressed and thereby the push buttons 3 are pressed through the plungers 13 and buffers 17.

As an alternative, electrical signals produced by the control device 8 are applied to an appropriate electromagnetic solenoid 15 so that the plunger 13 depresses the push button 3 for dialling operation against the elasticity of the return spring 14. It is possible to produce such electrical signals by the present technique of the electrical engineering or electronics. Especially, the dialling operation can be simplified by employing a control device which will be described in detail below.

Referring to FIG. 5 showing an outside view of the control device 8, numeral 21 shows manually-operated buttons for ordering cancellation during operation of the device, numeral 22 manually-operated buttons for indicating digits, and numeral 23 manually-operated buttons for indicating symbols which are so constructed that a plurality of push buttons on the push button dialled telephone can be operated in succession by depressing only a button. Numeral 24 shows a power switch, numeral 25 a lampfor indicating the power being supplied, and numeral 26 a lamp for indicating that the device is in operation, for example, as a result of depressing the buttons 21, 22 and 23.

Figure 6:
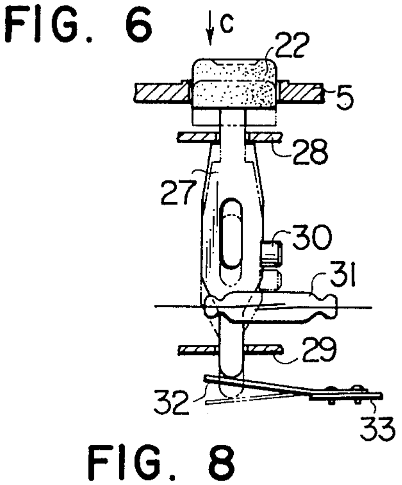

FIG. 6 shows the actual inner construction of the manually-operated buttons 22 which are provided on the control device to perform a single operation. The operating plate 27, on which an operating button 22 is fixed, is guided by support plates 28 and 29 movably both upward and downward. Numeral 30 shows a permanent magnet provided on the operating plate 27, numeral 31 a reed switch which is closed by the proximity of the permanent magnet 30, numeral 32 a spring plate which gives to the operating plate 27 through the lower end thereof elasticity almost equal to that given to the push button 3 of the push button dialled telephone, giving good tactile impression for operation. Numeral 33 shows a support for fixing an end of tthe spring plate 32 on the housing of the control device 8.

When depressed in the direction of arrow c, the manually-operated button 22 moves, together with the operating plate 27, to the position shown by a dotted line in FIG. 6. As a result, the reed switch 31 is closed by the proximity of the permanent magnet 30 which otherwise might be a distance way. In other words, electrical signals can be obtained by opening or closing the reed switch in accordance with the operation of the manually-operated button 22.

The inner construction of a portion of the manually-operated button 23 provided on the control device is shown in FIGS. 7 to 10. Numeral 34 shows an operating plate which is movable up and down and on which the manually-operated button 23 is fixed. Numerals 35 and 36 show supporting plates for guiding the operating plate 34, numeral 37 a roller-like ppin protruded from the operating plate 34, numeral 38 a rotary shaft rotated by a driving section which will be described later with reference to FIG. 11, numeral 39 a rotary plate which is mounted on the rotary shsaft 38 by means of the bush 40 and has an inwardly-curved flange 41 with an aperture 42 which is sufficiently large to allow the pin 37 to pass through it. Numeral 43 shows a permanent magnet bonded on part of the periphery of the flange 41, and numeral 44 a contact plate to give upward elasticity to the operating plate 34, provided with an insulating plate 45 through which it is in contact with the operating plate 34. Numerals 46 and 47 show contact plates which, together with the contact plate 44, make up a switch for controlling the rotation of the rotary shaft. Numerals 48 and 49 show reed switches which are closed when the permanent magnet 43 comes near them.

Figure 7:
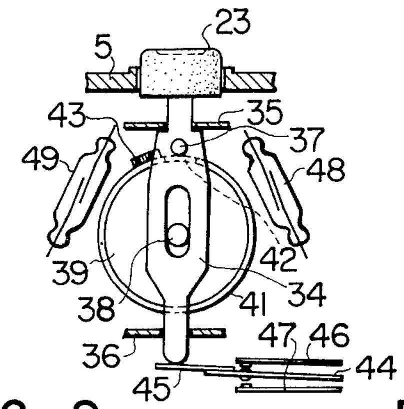
Figure 8:
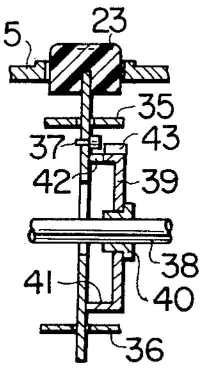
Figure 9:
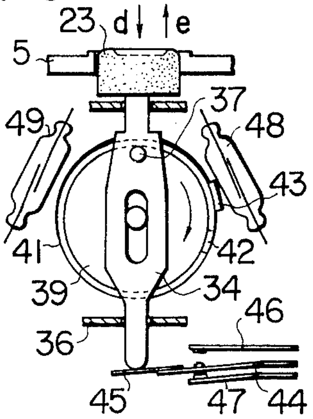
Figure 10:
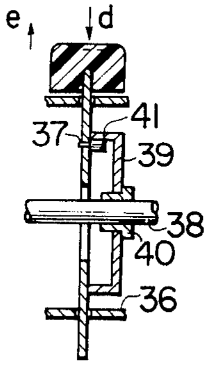

Before the manually-operated button 23 is depressed, the rotary shaft 38 is held stationary with the aperture 42 positioned at the topo, as shown in FIGS. 7 and 8. When the manually-operated button 23 is depressed in the direction d against the elasticity of the contact plate 44, the pin 37 passes through the aperture 42 and the operating plate moves in the same direction, so that the switch consisting of the contact plates 44, 46 and 47 is energized thereby to start rotating the rotary shaft 38. As a result, the pin 37 is maintained in a depressed state, as shown in FIGS. 9 and 10, as it is engaged with the flange 41 even after the pressure to the manually-operated button 23 is released. This is to prevent other manually-operated buttons 23 from being operated while two buttons are being operated, because it is often forgotton that the two buttons are being operated even though its operating period is very short. The rotary plate 39 thus continues rotating and the reed switches 48 and 49 are closed by the proximity of the permanent magnet 43. On completion of one rotation of the rotary plate, the pin 37 is allowed to pass through the aperture 42. On the other hand, the operating plate 34 which is given upward elasticity by the contact plate 44 moves in the direction e while at the same time actuating the switch comprising the contact plates 44, 46 and 47 thereby to control the driving section, stopping the rotation of the rotary shaft 38.

The driving means is shown in FIGS. 11 to 14, in which numeral 50 shows a rotary shaft opposed to the rotary shaft 38 through a spring clutch, numeral 51 a pulley mounted on the rotary shaft 50 with a nut 52, numeral 53 a motor, numeral 54 a belt for transmitting the turning effort of the motor 53 to the pulley 51, numeral 55 a piece of metal pressed into the rotary shaft 50, numeral 56 a coiled spring which is wound on the rotary shafts 38 and 50 in such a manner that the turning effort of either of the rotary shafts 38 and 50 is transmitted to the other rotary shaft in the winding direction of the coiled spring 56, numeral 57 a cylinder with a hook 58, and numeral 59 a pin secured to the cylinder 57 for holding an end of the spring 56. Numeral 60 shows a cam which has a fastening band 61 for fixing the other end of the spring 56 and is fixed on the rotary shaft 38. Numeral 62 shows a flange mounted on the rotary shaft 50 for preventing the lubricant in the spring clutch from being exposed. Numeral 63 shows a stopper which engages with the cam 60 to prevent the reverse rotation of the rotary shaft 38, and numeral 64 a bearing supporting the stopper 63 and maintained pulled in the direction of the rotary shaft 38. Numeral 66 shows a pin rotatably supporting the bearing 64, numeral 67 a yoke for a controlling magnet, and numeral 68 a return spring for a movable portion 69 and engaged with an end of a limiting arm 70. Numeral 71 shows a coil for the controlling magnet, numeral 72 lead terminals of the coil 71, numeral 73 a fixed iron core, and numeral 74 a latch which is mounted on the movable portion 69 with rivets 75 and 76 and engages with the hook 58 of the cylinder 57.

When the cylinder 57 is braked by the latch 74, force is applied in the direction of arrow f in FIG. 13 and the rotary shaft 50 rotates without any load for lack of the turning effort transmitted to it because the pin 59 is engaged with an end of the coiled spring 56. When a current is passed through the coil 71 of the magnet, however, the movable portion 69 is attracted to the fixed iron core 73, causing the latch 74 to come off the hook 58, so that the coiled spring is tightened and the turning effort of the rotary shaft 50 is transmitted to the rotary shaft 38, which is rotated in the direction g. In one rotation of the clutch, the magnet is de-energized, and when the movable portion 69 is restored to the original position, the braking latch 74 butts with the hook 58, thereby again exerting a force in such a direction as to wind back the coiled spring 56 to prevent the transmission of the driving force.

The above-mentioned signals applied to the magnet coil 71 are produced by a circuit constructed as shown in FIG. 15. Numeral 77 shows a switch made up of the contact plates 44, 46 and 47 as shown in FIGS. 7 to 10, numeral 78 a discharging resistor, numeral 79 a capacitor, numeral 80 a charging resistor, numeral 81 a switching transistor, numeral 82 an emitter resistor, numeral 83 a coil for driving the relay, numeral 84 a 6V DC power supply, numeral 85 contacts of the relay, numeral 86 a diode for absorbing a surge current, numeral 87 a voltage-regulating resistor of 10 KΩ, numeral 88 a protective resistor of 10Ω, numeral 89 a smoothing capacitor of 30 $\mu$F, numeral 90 a bridge rectifier circuit, and numeral 91 terminals to which a 100 V commercial voltage is applied.

The switch 77 is usually closed at the position shown in FIG. 15 but transfers to the h side shown by a dotted line when the manually-operated button 23 of the control device 8 is depressed, and as a result the capacitor 79 is charged by the DC power supply 84 through the resistor 80. During this charging period, the transistor 81 is triggerred and the relay coil 83 is energized. The contacts 85 are closed, passing a current in the magnet coil 71, so that the spring clutch is energized and the reed switches 48 and 49 are successively operated. On completion of the charging of the capacitor 79, the relay is restored to the original condition, de-energizing the magnet. This process is completed within one rotation of the rotary plate.

The inner construction of another portion of the manually-operated button 23 on the control device 8 is shown in FIG. 16. This portion is provided with reed switches 92, 93 and 94 for three-buttons' operation. Other component elements are similar to those shown in FIGS. 7 to 10, and like components are indicated by marking an apostrophe on corresponding numerals. Incidentally, dialling time with proper pauses can be obtained by reducing the rotational speed of the rotary shaft 38' to a lower level than the one as shown in FIGS. 7 to 8.

FIG. 17 shows electrical connections between the push button device 6 and control device 8. The push button device 6 is indicated by the operating buttons marked with numerals 1,2,3, . . . 9,0 and symbols "·" and "⊙" in combinations with the electromagnetic solenoids 15 connected to the operating buttons respectively. The control device 8 includes manually-operated buttons 22 and 23 and the power supply 92. The manually-operated buttons 22 may be replaced by the reed switch 31 as shown in FIG. 6, whereas the manually-operated buttons 23 may be replaced by the reed switches 48 and 49 of FIGS. 7 and 9 or by the reed switches 92, 93 and 94 of FIG. 16.

The operation of the above-mentioned circuit will be explained, taking as an example the calculation $4 \times 7 \times (3 + 5) - 8.6 + 2$. First, a button marked with number 4 among the manually-operated buttons 22 is operated, and then a current from the power supply 92 flows in the electromagnetic solenoid 15 corresponding to the button 4 of the push button device 6, causing the push button 3 marked with number 4 of the telephone to be depressed. When the button 23 marked with symbol X is depressed, the current from the power supply 92 first flows in the electromagnetic solenoid 15 marked with number 6, depressing a corresponding push button 3 of the telephone. Then, the current from the power supply 92 flows in the electromagnetic solenoid 15 marked with symbol , depressing a corresponding push button 3. In like manner, the operations of the push buttons indicated in the lower column of FIG. 18 are automatically performed by operating the buttons 22 and 23 of the control device 8 in accordance with the formula indicated in the upper column of FIG. 18. The operation of the manually-operated buttons 22 and 23 are so simple that they may be operated in accordance with the formula and erroneous operations can be avoided. In addition, the number of operations in which buttons are depressed is reduced. By the way, the rule of push button arrangement as shown in FIG. 18 is determined by a local telephone central.

Another embodiment of the operating section A of the push button device 6 will be described below with reference to FIGS. 19 to 23. Numeral 101 shows a housing for the push botton dialled telephone, numeral 102 push buttons, numeral 103 a housing for the push button device, numeral 104 a shaft movable up and down, numeral 105 operating buttons fixed at the top, and numeral 106 discs made of a mold of magnetic material and fixedly caulked on the shaft 104. The shaft 104 should preferably be a non-magnetic material. Numeral 107 shows a frame fixed on the housing 103 which is provided with a through hole at the bottom to receive the shaft 104 with a rectangular section in order to prevent the rotation of the frame itself. Numeral 108 shows a damper made of rubber fixed on the frame 107 and comprises four portions as shown in FIG. 23. Numeral 109 shows a cup-shaped magnetic yoke fixed on the damper 108 and has not only an electromagnetic solenoid 110 inserted in the cup but a bearing 111 of resin fixed at the central portion for guiding the shaft 104. A plurality of protrusions 112 of 0.5 mm to 1.0 mm in height are formed on the portions of the periphery of the magnetic yoke 109 which are in contact with the disc 106. The protrusions 112 are provided because if the disc is in contact with the yoke 109 without the protrusions 112, the electromagnetic solenoid 110 is not de-energized immediately after the current is cut off, due to the residual magnetism. Provision of the protrusions 112 as in the present embodiment reduces the contact area between the yoke 109 and the disc, thereby increasing the de-energizing speed of the electromagnetic solenoid 110 about five times that in the conventional devices. Numeral 113 shows a snap ring provided in the boundary between the rectangular and circular cylinder portions of the shaft 104, and numeral 114 a conical-coiled spring wound on the shaft 104 between the snap ring 113 and frame 107 for driving the shaft 104 upward. Numeral 115 shows a buffer provided on the bottom of shaft 104 and numeral 116 lead wires of the electromagnetic solenoid 110.

The push button device as above constructed operates in a similar way to those shown in FIGS. 3 and 4, the only difference being that in the push button device according to the present embodiment the plunger 13 is not driven directly by the electromagnetic solenoid 15 but the disc 106 is attracted by the electromagnetic solenoid 110 to move the shaft 104 and that the damper 108 is provided for improved tactile impression by reducing the shock due to the butting between the buffer 115 and push button 102 when the operating button 105 is depressed by a finger.

Unlike the push button devices according to the embodiments shown in FIGS. 3 and 4 and FIGS. 19 to 21 which are provided with one electromagnetic solenoid for each corresponding operating button 12, the embodiment which will be described below with reference to FIGS. 24 to 27 is so constructed that rotary shafts and slide plates arranged regularly both lengthwise and breadthwise are driven by electromagnetic solenoids, so that the push buttons on the telephone are pressed by hammers which are actuated by these rotary shafts and slide plates.

FIG. 24 shows a plan of the push button device excepting the housing, in which only one of the plurality of hammers provided corresponding to a plurality of push buttons is shown. Also, in the figure, some portions are indicated by dotted lines for clarification. Numeral 121 shows a frame which supports lengthwise three rotary shafts 122 rotatably and four slide plates 123 breadthwise. Numeral 124 show electromagnetic solenoids for rotating the rotary shafts 122 respectively, numeral 125 springs for driving the rotary shafts 122 unidirectionally, numeral 126 electromagnetic solenoids for pulling the respective slide plates 123, and numeral 127 springs for restoring the slide plates 123 to the original conditions respectively.

The construction of an operating button is illustrated in detail in FIGS. 25 to 27. Numeral 128 shows a housing of the push button device, numeral 129 an operating button which is operated by a finger, numeral 130 a button shaft with an operating button 129, buffer 132 and pedestal 131 fixed respectively at the top, bottom and intermediate parts thereof, numeral 133 a conical compression spring wound on the button shaft 130 between the housing 128 and pedestal 131, and numeral 134 a push button on the push buttom dialled telephone. Numeral 135 shows a protrusion provided on the slide plate 123, numeral 136 an arm fixed on the rotary shaft 122, and numeral 137 a hammer rotatably supported by a pin 138 and provided with a protrusion 140 for pressing in the direction of arrow *i* the pedestal 131 and the engaging portion 139 which is supplied with turning effort by engaging with the protrusion 135.

In this push button device, pressing manually the operating button 129 against the elasticity of the compression spring 133 permits the pressing of a corresponding push button 134 through the button shaft 130 and buffer 132. When wanting altenatively to depress the push button 134 of the telephone by means of electrical signals applied from outside, appropriate electromagnetic solenoids 124 and 126 are energized by a matrix circuit, which will be described later, thus rotating the rotary shaft 122 and moving the slide plate 123 to depress the push button 134. In other words, when the rotary shaft 122 rotates in the direction of arrow *j* from the state of FIG. 25, the arm 136 rotates to the state of FIG. 27 through that of FIG. 26. Since the slide plate 123 moves in the direction of arrow *k*, the engaging portion 139 of the hammer 137 is pressed by the protrusion 135, thereby causing the hammer 137 to rotate about the pin 138 with the result that the pedestal 131 is pressed downward by the protrusion 140. Therefore, the push button 134 is pressed down for a dialling operation.

Next, an electricaal circuit for energizing the electromagnetic solenoids 124 and 126 will be explained below. In FIG. 28, numeral 8 shows the control device in rough form which was described above with reference to FIGS. 5 to 17. This control device 8 transmits signals for controlling the push button device 6, through the cord 5 which includes twelve mutually independent wires. Numeral 141 shows a matrix circuit for appropriately controlling the electromagnetic solenoids 124 and 126 included in the push button device 6 and which is actually built in either the control device 8 or the push button device 6.

The signals representing the numerals 1, 2, 3, . . . 9, 0 and symbols "·" and "⊙" from the control device 8, which were described in detail above with reference to FIGS. 5 to 17, are converted by the matrix circuit 141 and controls appropriately the electromagnetic solenoids 124 and 126 for rotating the rotary shaft 122 and moving the slide plate 123, thereby depressing corresponding push buttons 134 of the telephone to accomplish a dialling operation. In this case, if the matrix circuit 141 is incorporated in the control device 8, the cord to provide connection with the push button device 6 may comprise eight independent wires.

The embodiment as shown in FIGS. 29 to 34 is a modification of the embodiment of FIGS. 24 to 27, and is so constructed that hammers are moved and push buttons on the telephone pressed by the slide plates and slide shafts which are arranged both lengthwise and breadthwise and driven by the electromagnetic solenoids. FIG. 29 shows a plan of the push button device excepting its housing, in which only one hammer is shown out of the plurality of the hammers provided corresponding to the respective push buttons. Numeral 151 shows a frame which movably supports three slide plates 152 lengthwise and four slide shafts 153 breadthwise. Numeral 154 shows electromagnetic solenoids for moving the slide plates 152, numeral 155 springs for applying unidirectional force to the slide plates 152, numeral 156 electromagnetic solenoids for driving the slide shafts 153, and numeral 157 springs for applying unidirectional force to the slide shafts 153.

The detailed inner construction of one operating button on the push button device 6 is shown in FIGS. 30 to 34. Numeral 158 shows a hammer facing the push button 159 of the telephone and rotatably supported on the slide shaft 153. The hammer 158 is provided with a protrusion 161 to engage with an aperture 160 of the slide plate 152. Numeral 162 shows an operating rod integral with the operating button 163 and having a buffer 164 fixed on the bottom thereof to press the hammer 158. Although not shown in FIG. 30, the operating button 163 is driven upward by a spring 166 interposed between it and the housing 165.

The operation of the above-mentioned device will be explained below. Depressing the operating button 163 by hand causes the hammer 158 to be pressed through the buffer 164 and rotated about the slide shaft 153. The resulting depression of a push button on the telephone by the end of the hammer 158 enables a dialling operation.

The dialling operation by electrical signals from an external control device will be explained next. The electrical signals transmitted by the control device 8 energize the electromagnetic solenoids 154 and 156 through a matrix circuit which will be described later. As a result of the energization of the electromagnetic solenoid 156, the slide shaft 153 moves in the direction of arrow *e*. The protrusion 161 of the hammer 158 changes from the state as shown in FIGS. 31 and 32 to the position where it is fitted in the aperture 160 of the slide plate 152. The subsequent actuation of the slide plate 152 by the electromagnetic solenoid 154 causes the hammer 158 to rotate about the slide shaft 153, thereby pressing the push button 159 of the telephone for dialling operation.

The embodiment as shown in FIGS. 29 to 34 is different from that of FIGS. 24 to 27 in that, in the former, it is necessary to slide the slide plate 152 only after the slide shaft 153 is slided.

A circuit for energizing the electromagnetic solenoids 154 and 156 is shown in FIG. 35. The electrical signals transmitted through a cord 5 from the control device which was described with reference to FIGS. 5 to 17 are applied to a diode matrix circuit 167, where they are converted into signals for energizing the electromagnetic solenoids 154 and 156 and applied to the push button device 6. The matrix circuit 167 is different from the matrix circuit 141 shown in FIG. 28 in that in the matrix circuit 167, the signals are applied through a delay line 168 to the electromagnetic solenoid 154 for driving the slide plate 152.

Explanation will be made now of an embodiment in which the electrical signals derived from the operation of the manually-operated button 23 on the control device 8 for controlling the push button device 6 are obtained purely electrically but not mechanically as by moving a permanent magnet as shown in FIGS. 7 to 16. Referring to FIG. 36, numerals 171, 172 and 173 show monostable multivibrators which include differentiating circuits respectively for convenience's sake, a detailed circuit diagram thereof being shown in FIG. 37. Numeral 174 shows a switch which is controlled by the depression of a push button on the control device 8, numeral 175 a terminal for a positive power supply, numerals 176, 177 and 178 switching transistors which are respectively controlled by the monostable multivibrators 171, 172 and 173, numeral 179, 180 and 181 capacitors inserted respectively between the ground and the switching transistors 176, 177 and 178, and numerals 182, 183 and 184 coils for energizing relays which are connected respectively to the collectors of the transistors 176, 177 and 178.

Reference will be made to FIG. 37 before explaining the operation in connection of the block diagram of FIG. 36. FIG. 37 shows a detailed circuit diagram of a block included in FIG. 36. When the swiitch 174 is closed, a current which charges the capacitor 185 flows through the diode 186, thereby cutting off the transistor 187. The collector potential of the transistor 187 rises and the resultant current flowing into the capacitor 179 through the resistor 188 charges it. When a certain amount of charges are stored in this capacitor 179, the transistor 176 is triggerred and thereby a current flows in the driving coil 182, controlling the opening and closing operations of the relay contacts 189 which are equivalent to the reed switch 92 as shown in FIG. 16. Although the monostable multivibrator 171, transistor 176 and capacitor 179 are shown in FIG. 37 as an example, the same can be said of the other monostable multivibrators 172 and 173, transistors 177 and 178 and capacitors 180 and 181 as far as their constructions and operations are concerned.

The monostable multivibrator 171 connected in cascade changes its state when the switch 174 is closed. When the monostable multivibrator 171 returns to the original state, the monostable multivibrator 172 in the next stage changes its state. In like manner, when the monostable multivibrator 172 restores its original state, the monostable multivibrator 173 in the next stage changes its state. In other words, the monostable multivibrators 171, 172 and 173 change their states in sequence at regular time intervals. Therefore, the driving coils 182, 183 and 184 are sequentially energized a certain time — which constitutes a pause — behind the time points when the monostable multivibrators 171, 172 and 173 return to the original states respectively. As a consequence, it is possible to produce electrical signals for controlling the push button device 6 by controlling the "on" and "off" periods of the transistors 176, 177 and 178 which depend on the capacitance values of the capacitors 179, 180 and 181 and the values of the resistor 190 and capacitor 191 affecting the time to change the state of the monostable multivibrators.

The three monostable multivibrators in FIG. 36 are equivalent to the three reed switches shown in FIG. 16, and by depressing a manually-operated button on the control device 8 once, the switch 174 is closed to generate an electrical signal which enable three push buttons to be depressed on the push button device 6. Also, elimination of the monostable multivibrator 173, capacitor 181, transistor 178, and driving coil 184 from the circuit of FIG. 36 makes it possible to achieve the same operation as is achieved by the device in FIGS. 7 and 9, thereby permitting the depression of two buttons on the telephone by depressing a manually-operated button on the control device once.

An automatic dialling device which consists of the push button device as shown in FIGS. 1 to 4 and other means added to it will be explained now with reference to FIGS. 38 to 53. Depression of an operating button 12 on the push button device 6 is detected by a detector means, output of which is recorded on magnetic tape, the recorded signals being reproduced for accomplishing a call by automatic dialling. The device as shown in FIGS. 38 to 40 differs from the one shown in FIGS. 1 to 4 in that an automatic dialling device proper 201 with a magnetic recording and reproducing means is provided instead of the control device 8 and that the fixing ring 18 of the push button device 6 has an extension 202 for fixing the permanent magnet 204 which controls the operation of the reed switch 203.

The automatic dialling device proper 201 comprises columns 205 for indicating called parties, a knob 206 for selecting a party to be called, a switch 207 for starting automatic dialling, a reset button 208 for stopping an automatic dialling operation, and a lamp 209 for indicating that the device is recording a telephone number.

The internal construction of the device proper 201 will be explained now. FIG. 41 shows the magnetic recording and reproducing section built in the device proper 201, in which numeral 210 shows a wide tape wound around two rollers 211 and 212 on which both ends thereof are fixed, and numerals 213 and 214 gears provided on the edges of the rollers 211 and 212 respectively for engaging with driving gears 215 and 216. The driving gears 215 and 216 are rotated by a driving means 217 to feed the magnetic tape 210 either in the direction of arrow *m* for the recording of a telephone number or in the reverse direction for rewinding operation at high speed. Numeral 218 shows a holder which supports a 4-track recording-reproducing magnetic head 219 and is slidably supported on a guide 220. Numeral 221 shows a belt interlocked with the knob shown in FIG. 38. The holder 218 which is fixed on the belt 221 moves the magnetic head 219 in the transverse direction of the magnetic tape 210 when the knob 206 is turned, and with magnetic head 219 placed opposite to a selected track, a recording or reproducing operation is performed.

Processes for recording a telephone number with the magnetic head 219 will be explained below with reference to FIG. 42. Depressing the operating buttons 12 on the push button device 6 of FIG. 38 by hand causes corresponding reed switches 203 to be closed. Electrical signals generated as a result of the closing and opening operations of those reed switches operated among the twelve switches 203*a* to 203*e* are applied through diodes 222 to AND circuits 223. These signals are also applied through diodes 224 and a differentiating circuit 225 to timing circuits 226 and 227. The timing circuit 226 is for driving a motor 228 included in the driving means 217, feeding the magnetic tape and lighting the indication lamp 209, for a certain period of time, while the timing circuit 227 is for sending the signals to the AND circuits 223. The signals pass through only those AND circuits 223 corresponding to the depressed push buttons 12 and are applied, through recording amplifiers 230a to 230d and recording-reproducing changeover switches 229 closed on the recording sides, to a magnetic circuit of the magnetic head 219 for an appropriate one of the four tracks to perform a recording on the magnetic tape 210. The provision of the timing circuits 226 and 227 eliminates the waste of magnetic tape, since pauses are limited to a predetermined length even if the actual period of depressing the operating buttons 12 or pauses included in the operating period are longer.

As can be seen from FIG. 42, the operations of depressing the 12 operating buttons 12 are recorded by the 4-track magnetic head 219 in the form of codes shown by black balls in FIG. 43. In other words, signals representing numeral or digit 1 are recorded only on the first track, signals representing numeral 2 only on the second track, and signals representing numeral 3 only on the first and second tracks. In like manner, numerals 4 and 0 and symbols "·" and "⊙" are encoded. FIG. 44 shows signals representing a telephone number 1679 which are recorded on the magnetic tape 210 by the binary codes, the heavy solid lines 231 and chains 232 indicating where the signals are recorded and not recorded respectively. The portion indicated by each of the solid lines 231 may represent the time period of about 50 ms and each of the portions without the signals or a pause about 100 ms. Actually, however, periods several times longer than the above-mentioned ideal values should be set taking into consideration a rise time involved in a driving system for the motor 228.

FIG. 45 shows a circuit in which the electromagnetic solenoids 15 of the push button device 6 are energized by signals reproduced by the magnetic head 219, thereby performing automatic dialling operation. The signals reproduced from the running magnetic tape 210 by the magnetic head 219 are applied to reproducing amplifiers 233*a* to 233*d* through the change-over switches 229 which are closed on the reproducing side. Outputs of the reproducing amplifiers 233 are applied to monostable multivibrators 235*a* to 235*d* after being differentiated and separated in polarity. Numeral 236 shows a diode matrix circuit to which the outputs of the monostable multivibrators 235 are applied. A multiplicity of semicircular marks 236 show schematically junction points of the diodes from which it is known that a terminal 237 of the positive power supply is connected toward the monostable multivibrators 235 through the diodes. Under normal conditions, the monostable multivibrators 235 are energized on the Q sides and cut off on the Q sides. But when input signals are applied to the Q sides, the Q sides are switched to "ON" and the $\overline{Q}$ sides to "OFF." The monostable multivibrators 235 are protected from erroneous operations due to noises by being so constructed that they are not energized by input waves of a very short duration.

In accordance with appropriate combinations of the Q sides of the monostable multivibrators 235 which have received reproducing signals and the Q sides of the monostable multivibrators 235 which have received no reproducing signals, the diodes at the semicircles 236 are energized by the power supplied from the connecting terminal 237 through the resistors 238, thereby energizing corresponding members of the switching circuits 239*a* to 239*e*. The switching circuits 239 energize corresponding electromagnetic solenoids 15 of the push button device 6, whereby push buttons on the telephone are depressed for automatic dialling operation.

Waveforms of operations of the automatic dialling device and signals involved are shown in FIG. 46. Character A shows the operation of the timing circuit 226 and also that of the driving means 217, character B the operation of the timing circuit 227, character C a waveform of a recording signal applied to one of the magnetic circuits of the magnetic head 219, character D a waveform of a signal reproduced by the magnetic head 219, character E a waveform of a signal converted by the converter circuit 234, and character F a waveform of operation of the electromagnetic solenoid 15.

FIG. 47 is a schematic diagram showing another embodiment of the reproducing circuit in which part of the circuit is not shown. In this figure, like parts are indicated by like numerals shown in FIG. 45. Signals reproduced by the magnetic head 219 are applied to a converter 240 through a reproducing amplifier 233 and change-over switch 229 closed on the reproducing side. The converter 240 includes a differentiating circuit and polarity-separating circuit and its output is applied to the flip-flops 241 for set-reset operations. Output of the flip-flops 241 are applied to a switching circuit 239 through the diode matrix circuit 242, thereby energizing the electromagnetic solenoids 15 of the push button device 6 for performing automatic dialling operation. In this circuit, as soon as the magnetic tape 210 starts to run, reset signals are applied to th flip-flops 241*a* to 241*d* through the terminal 243 and diode 244 in order to make sure that the flip-flops 241 are not in a set state when they start operating. Again, unlike the embodiment as shown in FIG. 45, the operations of the timing circuits 226 and 227 must be accurate, since the periods of such operations directly influence pauses and operating periods of the push button device 6.

The automatic dialling device shown in FIGS. 48 to 50 is different from the one shown in FIGS. 42 to 47 in that in the latter the 4-track magnetic head 219 placed is face to face with the magnetic tape 210 for recording and reproducing a telephone number, while the former employs a 2-track magnetic head for recording and reproducing operations.

The device shown in FIG. 48 is constructed almost in the same way as is the one in FIG. 42, and like parts are indicated by like numerals. The only difference lies in that instead of the four recording amplifiers 230*a* to 230*d* as shown in FIG. 42, two recording amplifiers 251*a* and 251*b* are provided and that registers 252, a shift pulse generator 253 and AND circuit 268 are inserted between the amplifier 251 and AND circuit 223 in the preceding stage.

Explanation will be made now of the difference in operation resulting from the above-mentioned difference in construction. The outputs of the 4 AND circuits 223 are stored temporarily in the registers 252. In order to record these signals on the magnetic tape 210 in sequence, shift pulses generated by the pulse generator 253 are applied to the registers 252 thereby to send out in series through the AND circuit 268 the signals stored. In other words, the parallel signals stored in the register 252 are applied to one of the magnetic circuits of the magnetic head 256 through the AND circuit 255, amplifier 251 and recording-reproducing change-over switch 225 and recorded on the magnetic tape 210 as a series pulse train. In addition to the four shift pulses, another pulse generated by the pulse generator 235 which indicates completion of recording of one digit is applied to the amplifier 251 and further to the other magnetic circuit of the magnetic head 256.

Explanation will be made below of the magnetic tape 210 with signals recorded on it by the use of the parallel-series converting shift register 252, with reference to FIG. 49. The magnetic tape 210 runs by the length *n* for every digit of a telephone number and a pattern 257 of 4 pulses is formed in a track within the range of P, while a pattern 258 of clock pulses, namely, the above-mentioned shift pulses is formed in an adjacent track. Numerals 259 and 260 show pulse trains following the patterns 257 and 258 respectively.

A reproducing circuit in contrast with the recording circuit of FIG. 48 is shown in FIG. 50, in which signals read out of the magnetic tape 210 by a recording-reproducing magnetic head 256 are applied to a reproducing amplifier 261 through a change-over switch closed on the reproducing side. Outputs of the reproducing amplifier 261 are stored in sequence in the registers 263 directly or through a delay line 262. On the other hand, the clock pulses detected by the magnetic head 256 are counted by a 4-pulse counter comprising flip-flops 264 and 265 and timing circuit 266 and gate signals are applied by the counter to AND circuits 267, whereby the series signals stored in the registers 263 are converted into parallel signals and applied to the monostable multivibrators 235. The monostable multivibrators 235, diode matrix circuit 236 and switching circuits 239 are similar in operation to those shown in FIG. 45.

FIGS. 51 and 52 show essential parts of recording and reproducing circuits respectively for recording and reproducing a telephone number by the use of one-track magnetic head. Referring to FIG. 51, the input side is connected with a reed switch 203 and diode 224 similar to those shown in FIG. 48 and is not shown. Outputs of the timing circuit 227 energize the AND circuits 223 and the resultant signals are stored in the shift registers 252, while at the same time energizing the shift pulse oscillator 272 and the 4-pulse limiting circuit 273, so that four shift pulses are applied through the AND circuit 274. Thus, the signals representing a telephone number which are stored in parallel are sent out in series through the AND gate 268, but when there is no digit signal, only shift signals are applied through the gate circuit 275 and after being inverted in polarity by the pulse inverter 276, are applied to the recording amplifier 277. Output of the recording amplifier 277 is applied through the recording-reproducing change-over switch 278 to the magnetic head 279 for recording operation. The above-mentioned gate circuit 275 is such that pulses are produced in the next stage if there are pulses not on the register side but on the shift side.

Referring to FIG. 52 showing a reproducing circuit, reproducing signals are applied through a reproducing amplifier circuit 280 to rectifier-shaper circuits 281 and 282. The circuit 281 picks up and sends out only positive pulses, while the circuit 282 inverts negative pulses and sends out 4 positive pulses. The output signals of the circuit 281 are stored in the registers 283*a* to 283*d*, and the 4 shift pulses sent out by the circuit 282 are applied through the delay line 284 to registers 283, while at the same time being counted by a counter 285. On completion of the counting operation, the counter 285 is reset, and at the same time the signals stored in series through the AND circuits 286*a* to 286*d* are read out in parallel and transmitted to a circuit 287 comprising the monostable multivibrators 235, diode matrix circuit 236 and switching circuits 239, so that the electromagnetic solenoids of the push button device 6 are energized to perform automatic dialling operation.

A recording pattern formed on the magnetic tape 210 by a one-track magnetic head is shown in FIG. 53, in which the presence and absence of stored parallel signals are indicated by positive and negative recording pulses 288 respectively. According to this method, recording capacity can be increased in comparison with the recording method employing the 2-track magnetic head 256 as shown in FIGS. 48 to 50.

What is claimed is:

1. In a repertory telephone dialling system, apparatus for recording telephone dialling instruction signals onto a recording medium, comprising:

recording means for recording information onto said recording medium, wherein said recording means comprises first and second recording portions for independently recording information onto corresponding first and second portions of said recording medium;

a matrix circuit;

a plurality of information signal generating means coupled to corresponding inputs of said matrix circuit;

a plurality of first logic AND circuits having first inputs coupled to corresponding outputs of said matrix circuit;

a timing circuit having its output coupled in common to second inputs of said first logic AND circuits;

means coupling outputs of said information signal generating means in common to an input of said timing circuit;

a parallel input-serial output shift register having its inputs coupled to the outputs of said first logic AND circuits;

pulse generating means for generating a predetermined plurality of pulses having its input coupled to the output of said timing circuit and a first output coupled to a shift instruction input of said shift register, wherein said pulse generating means generates said plurality of pulses at said first output and a reference pulse at a second output thereof and said first and second pulse generating means outputs are coupled to said second recording means portion such that output signals generated by said pulse generating means are recorded on said second portion of said recording medium; and a second AND logic circuit having a first input coupled to said shift register output, a second input coupled to said first output of said pulse generating means and its output coupled to an input of said first recording means portion for recording output signals from said shift register and from said pulse generating means onto said recording medium.

2. In a repertory telephone dialling system, apparatus for recording telephone dialling instruction signals onto a recording medium, comprising:

recording means for recording information onto said recording medium;

a matrix circuit;

a plurality of information signal generating means coupled to corresponding inputs of said matrix circuit;

a plurality of first logic AND circuits having first inputs coupled to corresponding outputs of said matrix circuit;

a timing circuit having its output coupled in common to second inputs of said first logic AND circuits;

means coupling outputs of said information signal generating means in common to an input of said timing circuit;

a parallel input-serial output shift register having its inputs coupled to the outputs of said first logic AND circuits;

pulse generating means for generating a predetermined plurality of pulses having its input coupled to the output of said timing circuit and an output coupled to a shift instruction input of said shift register;

a second AND logic circuit having a first input coupled to an output of said shift register and a second input coupled to an output of said pulse generating means, and an output coupled to said recording means; and a third AND logic circuit having a first input coupled to said shift register output through an inverter circuit, a second input coupled directly to said pulse generating means output, and an output coupled to said recording means through an inverter circuit.

* * * * *